(12) United States Patent
Rempel

(10) Patent No.: US 8,468,019 B2
(45) Date of Patent: Jun. 18, 2013

(54) ADAPTIVE NOISE MODELING SPEECH RECOGNITION SYSTEM

(75) Inventor: Rod Rempel, Port Coquitlam (CA)

(73) Assignee: QNX Software Systems Limited, Kanata, Ontario ( * ) Notice: Subject to any disclaimer, the term of this patent is extended or adjusted under 35 U.S.C. 154(b) by 1070 days.

(21) Appl. No.: 12/023,381

(22) Filed: Jan. 31, 2008

(65) Prior Publication Data

US 2009/0198492 A1 Aug. 6, 2009

(51) Int. Cl.
*G10L 15/20* (2006.01)
*G10L 15/00* (2006.01)

(52) U.S. Cl.
USPC ............................. 704/228; 704/251

(58) Field of Classification Search
None
See application file for complete search history.

(56) References Cited

U.S. PATENT DOCUMENTS

| | | | | |
|---|---|---|---|---|
| 5,890,113 | A * | 3/1999 | Takagi | 704/231 |
| 5,960,397 | A * | 9/1999 | Rahim | 704/244 |
| 5,970,446 | A * | 10/1999 | Goldberg et al. | 704/233 |
| 6,959,276 | B2 * | 10/2005 | Droppo et al. | 704/226 |
| 7,058,190 | B1 | 6/2006 | Zakarauskas et al. | |
| 7,065,487 | B2 * | 6/2006 | Miyazawa | 704/233 |
| 7,117,149 | B1 | 10/2006 | Zakarauskas | |
| 7,266,494 | B2 * | 9/2007 | Droppo et al. | 704/228 |
| 7,403,896 | B2 * | 7/2008 | Takiguchi et al. | 704/256.2 |
| 7,590,530 | B2 * | 9/2009 | Zhao et al. | 704/226 |
| 7,660,717 | B2 * | 2/2010 | Takiguchi et al. | 704/256.2 |
| 7,676,363 | B2 * | 3/2010 | Chengalvarayan et al. | 704/233 |
| 7,729,911 | B2 * | 6/2010 | Chengalvarayan et al. | 704/245 |
| 2003/0120485 | A1 * | 6/2003 | Murase et al. | 704/228 |
| 2004/0153321 | A1 | 8/2004 | Chung et al. | |
| 2008/0091426 | A1 | 4/2008 | Rempel et al. | |

FOREIGN PATENT DOCUMENTS

EP 1 562 178 A1 8/2005

\* cited by examiner

*Primary Examiner* — Talivaldis Ivars Smits
(74) *Attorney, Agent, or Firm* — Brinks Hofer Gilson & Lione

(57) ABSTRACT

An adaptive noise modeling speech recognition system improves speech recognition by modifying an activation of the system's grammar rules or models based on detected noise characteristics. An adaptive noise modeling speech recognition system includes a sensor that receives acoustic data having a speech component and a noise component. A processor analyzes the acoustic data and generates a noise indicator that identifies a characteristic of the noise component. An integrating decision logic processes the noise indicator and generates a noise model activation data structure that includes data that may be used by a speech recognition engine to adjust the activation of associated grammar rules or models.

16 Claims, 8 Drawing Sheets

ADAPTIVE NOISE MODELING SPEECH RECOGNITION SYSTEM

BACKGROUND OF THE INVENTION

1. Technical Field

The invention relates to communication systems, and more particularly, to systems that improve speech recognition.

2. Related Art

Some computer applications make it easy to interact with an application through an exchange. These systems have the ability to understand spoken requests and commands. There exists a broad spectrum of speech recognition applications from relatively simple command-and-control systems to extremely advanced large-vocabulary continuous-recognition systems.

Speech recognition systems receive a combination of speech inputs and background noises. Some speech recognition systems attempt to improve speech recognition by modeling the background noises and suppressing them from the speech input. Some of these systems incorrectly identify portions of the speech input as background noise, and adversely affect the performance of the system by suppressing these misidentified inputs. Other systems may suffer performance problems when some background noises are suppressed but others are not.

SUMMARY

An adaptive noise modeling speech recognition system may improve speech recognition by modifying an activation of the system's grammar rules or models based on detected noise characteristics. An adaptive noise modeling speech recognition system includes a sensor that receives acoustic data having a speech component and a noise component. A processor analyzes the acoustic data and generates a noise indicator that identifies one or more characteristics of the noise component. An integrating decision logic processes the noise indicator and generates a noise model activation data structure that includes data that may be used by a speech recognition engine to adjust the activation of associated grammar rules or models.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
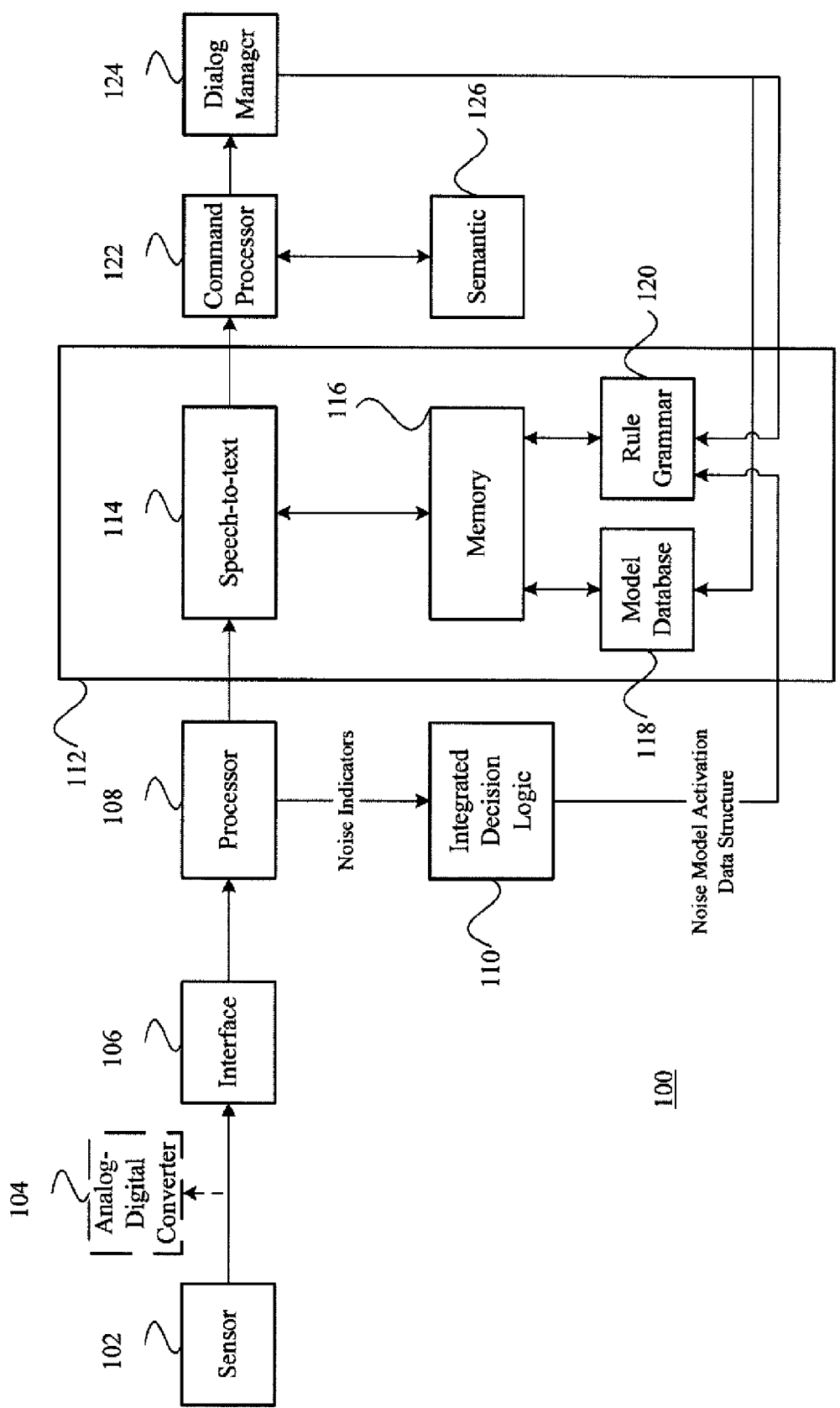
FIG. 1 is a block diagram of an adaptive noise modeling speech recognition system.

FIG. 1 is a block diagram of an adaptive noise modeling speech recognition system 100. While the system may include a multiple channel input, such as a multimodal adapter or multimodal interface that may process voice and/or other inputs serially or in parallel, in FIG. 1, an interface 106 receives inputs that were converted into analog or digital acoustic data. A sensor 102 may couple with the interface 106 and may convert the inputs into the acoustic data which may include a speech component and a noise component. In some systems, the sensor 102 may be a microphone and may include or communicate with an analog-to-digital converter 104. In other systems, the analog-to-digital converter 104 may be a unitary part of the sensor 102.

A processor 108 receives the acoustic data from the interface 106 and may identify one, two, three, or many more noises or combination of noises in the acoustic data. In some processors 108, noises may be identified, classified, or characterized through a matching process in the time and/or frequency domain. The received noise may be matched to noise models retained in an internal or external memory (e.g., a memory that is part of a speech recognition system, engine, and/or another internal or external memory). When a model does not exist for a received noise, the processor 108 or another processor may model this noise and cause it to be stored in the memory.

In addition to identifying the type of noise, the identification process may determine one or more characteristics of the noise. These characteristics may be related to the environment in which the acoustic data is detected, such as if the environment is highly-dynamic, fast-changing, noisy relative to associated speech, and/or other environmental characteristics. Alternatively, the characteristics may be related to the type of detected noise, or may be related to the detected noise's waveform. In response to the type and/or detected characteristic(s) of the noise, the processor 108 may transmit a noise indicator to the integrating decision logic 110. In some systems, the noise indicator may comprise the type of identified noise, a signal-to-noise ratio, an absolute noise level, and/or other noise characteristics. In other systems, the noise indicator may include spectral shape information of the noise, temporal noise information representing a type of noise or noise pattern that is detected at a particular time, and/or frequency information representing how often a particular noise or noise pattern is detected. In yet other systems, the noise indicator may include statistical information (e.g., long and/or short-term probabilities of the detected noise), a confidence score of the accuracy of the detected noise, and/or predetermined information based on the spectral shape of the noise. In these systems, if a particular spectral shape of noise is detected, the noise indicator may include predetermined parameter values, such as a dynamic indicator level. In other systems the noise indicators may be the output of a neural-network utilizing one or more combinations of time, frequency, and/or pattern information. In addition to transmitting the noise indicator, the processor 108 may modify the acoustic data before transmitting it to a speech recognition engine 112. In some systems this modification may include filtering or otherwise reducing the ambient noise, isolating voiced from unvoiced segments and/or modifying spectral content of the data. The data passed from the processor 108 to the speech recognition engine 112 may be transformed and/or normalized either by the processor 108 or a speech-to-text logic 114 into one or more alternative representations of the acoustic data. These alternative representations may allow for reduced memory or computational requirements, and may result in improved recognition accuracy.

The speech recognition engine 112 processes the data to generate a textual string/phrase according to recognized utterance subcomponents stored in a model database 118 that are constrained by rules and statistical models retained in a rule grammar database 120. The model database 118 may contain representations of various types of non-speech noises in addition to representations of speech utterance subcomponents. The model database 118 and rule database 120 may be stored in common or separate files in a non-volatile or a volatile memory 116 integrated with (e.g., a unitary part of) or separate from the speech recognition engine 112. Once generated, the textual string/phrase may be passed to second tier software and/or a device, such as a command processor 122, a dialog manager 124, and/or semantic unit 126 that formats and/or uses the textual string/phrase to provide a control and/or input signal to one or more linked devices and/or applications. In some systems, the speech recognition engine 112 generates a single textual string/phrase. In other systems, the textual string/phrase is represented by an n-best list of textual strings (where "n" may be an integer) or a word lattice of likely matches to a user's utterance.

The integrated decision logic 110 processes the noise indicator information and generates a noise model activation data structure that is transmitted to the speech recognition engine 112. The noise model activation data structure may comprise data that controls how various rules retained in the rule grammar database 120 are applied during the data recognition process. In some systems, the activity of the rules may be increased or decreased based on the type of noise detected at a particular time or how often a particular noise is detected. In other systems, the activation of the rules may be adapted based on a numerical quantitative measurement of a noise level, such as when acoustic data is received from a high or low noise environment. In yet other systems, the activity of the rules may be adapted based on a statistical analysis of the detected noise, such as short-term or long-term probabilities, or a weighted or un-weighted confidence score associated with the type of detected noise. In some systems, the noise model activation data structure may include data that is applicable to a specific grammar rule. In other systems, the noise model activation data structure may include data that adjusts more than one grammar rule. In these systems, some grammar rules may be programmed to be more aggressive while other grammar rules may be programmed to be less aggressive. The determination of which grammar rules should be adjusted in response to the detected characteristic(s) of the noise may be application and/or hardware and/or software dependent. The activity of a particular rule may be varied by adjusting model transition probabilities, by adjusting model duration probabilities, or adjusting operational acceptance/rejection thresholds. The activity of a particular rule may be varied by selecting between different rule and/or model representations of a particular noise type.

The noise model activation data structure may be generated based on a statistical analysis of the noise indicators, in response to stored levels trained by a user or manufacturer, through template pattern matching (such as described in commonly assigned U.S. Pat. No. 7,117,149, which is herein incorporated by reference), and/or other noise modeling data processing techniques stored in an internal or external memory. Alternatively, the presence of specific noises or general noise categories may be estimated or identified as described in commonly assigned U.S. patent application Ser. No. 11/331,806 entitled, "Repetitive Transient Noise Removal," now U.S. Pat. No. 8,073,689; Ser. No. 11/252,160 entitled, "Minimization of Transient Noises in a Voice Signal," now U.S. Pat. No. 7,725,315; Ser. No. 10/688,802 entitled, "System for Suppressing Wind Noise," now U.S. Pat. No. 7,895,036; Ser. No. 10/410,736 entitled "Wind Noise Suppression System," now U.S. Pat. No. 7,885,420; and Ser. No. 11/006,935 entitled, "System for Suppressing Rain Noise," now U.S. Pat. No. 7,949,522, each of which is herein incorporated by reference. The noise model activation data structure may be a summary and/or integration of the individual noise confidences associated with the generated noise indicator(s). The noise model activation data structure may be derived by linear or nonlinear modeling, where the predictor variables are one or more individual noise levels or confidences. The noise model activation data structure may alternatively be derived from the predictor variables with a neural-network, fuzzy-logic, or other forms of integrating systems. The noise modeling data processing techniques may be acquired or modified through user interaction, or acquired or modified through local (e.g., command processor, dialog manager, etc.) or remote sources, such as a peripheral device, through a wireless or hardwired connection. The data processing techniques used to generate the noise model activation data structure may be adapted, based on feedback from a higher level application software and/or hardware, or by user action.

Figure 2:
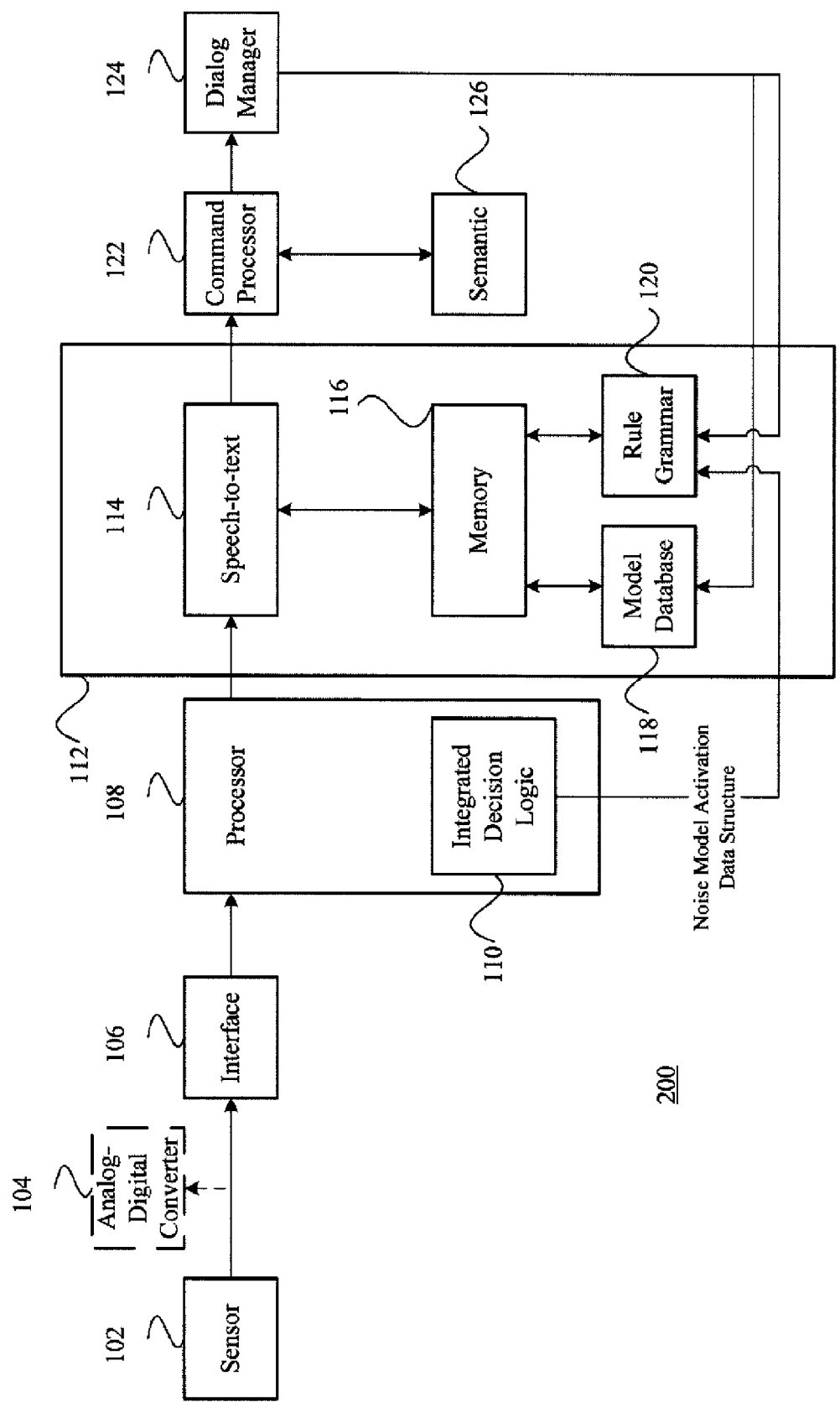
FIG. 2 is block diagram of an integrating decision unit unitary with a processor.
Figure 3:
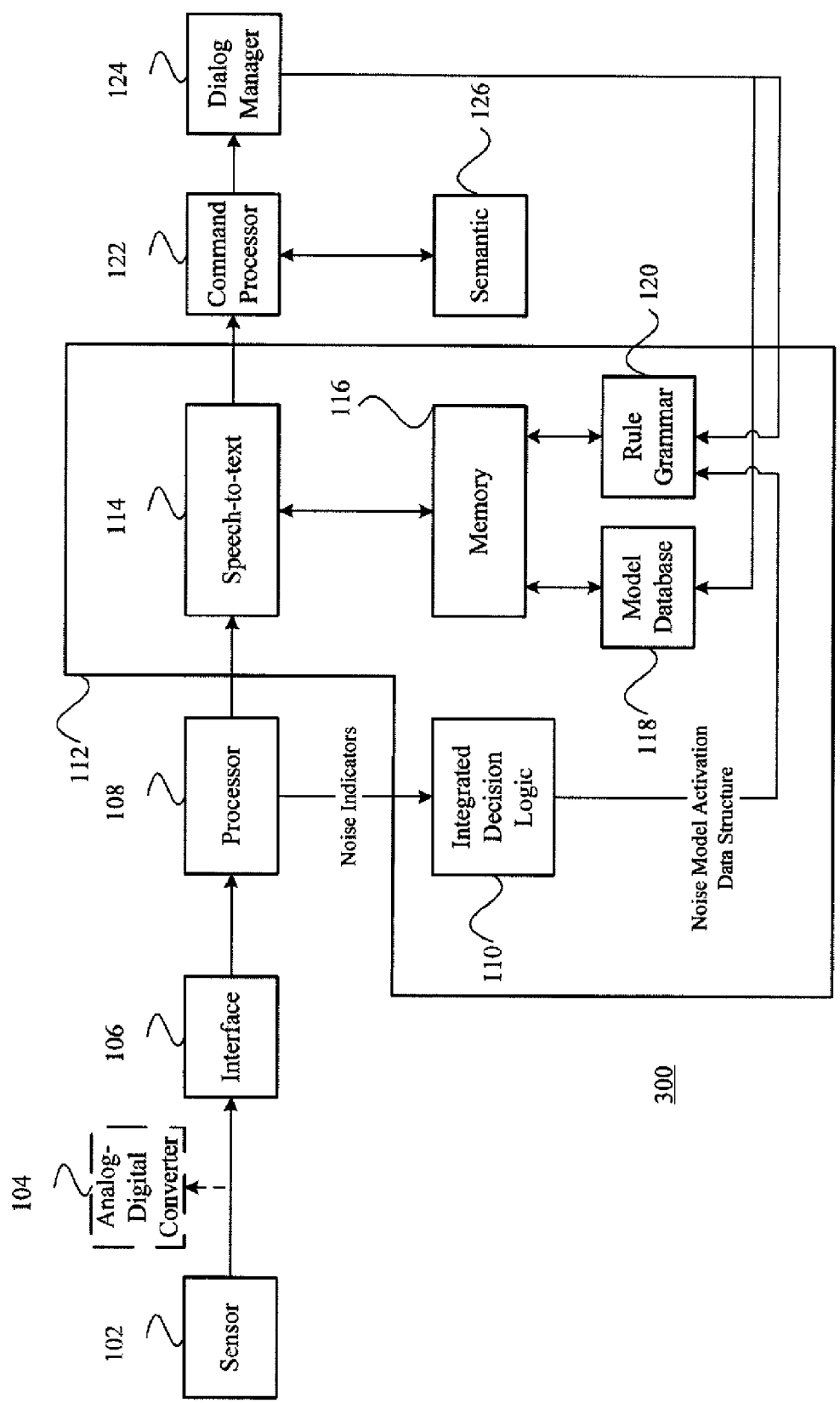
FIG. 3 is a block diagram of an integrating decision unit unitary with a speech recognizer.
Figure 4:
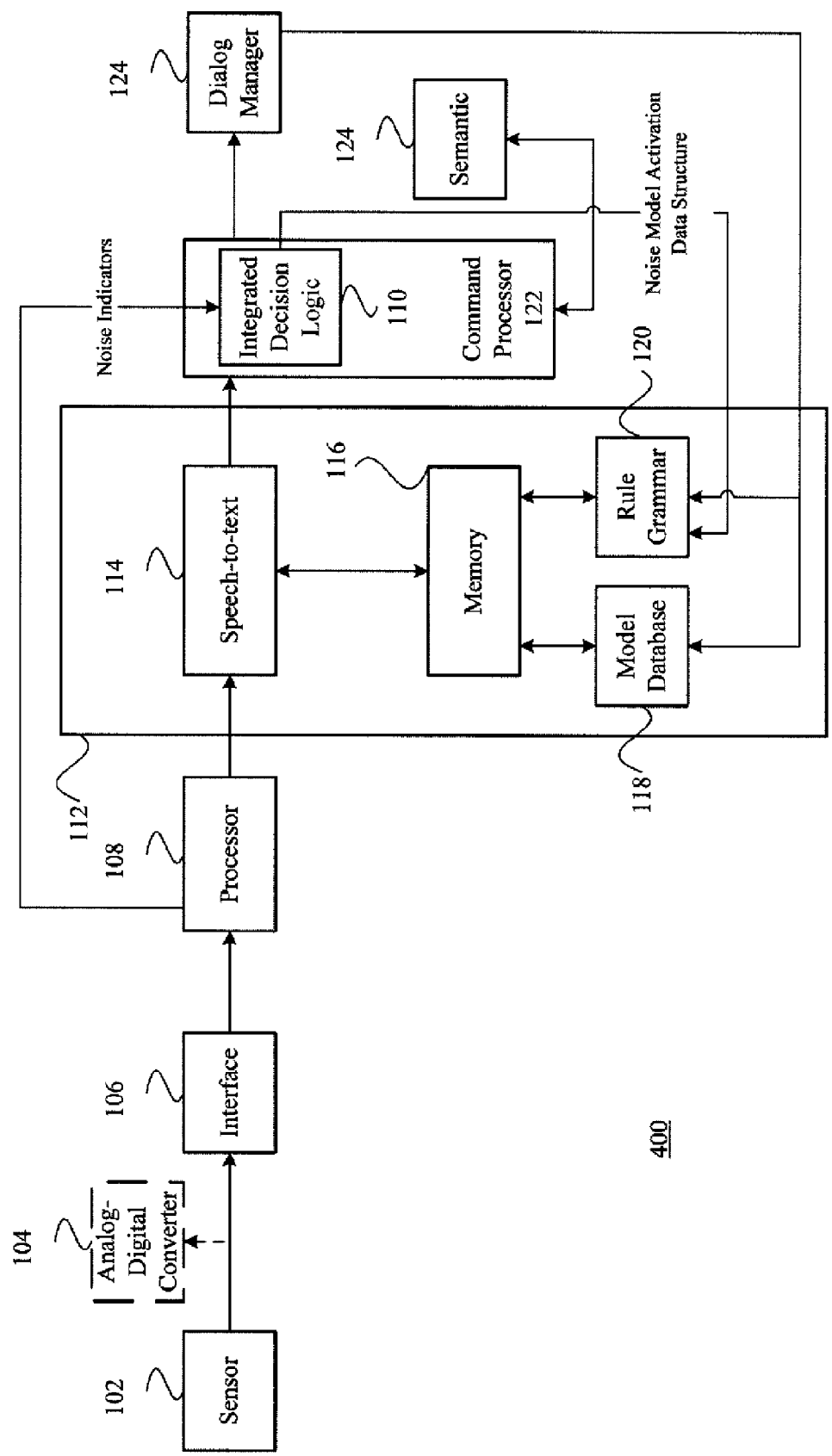
FIG. 4 is a block diagram of an integrating decision unit unitary with a command processor.
Figure 5:
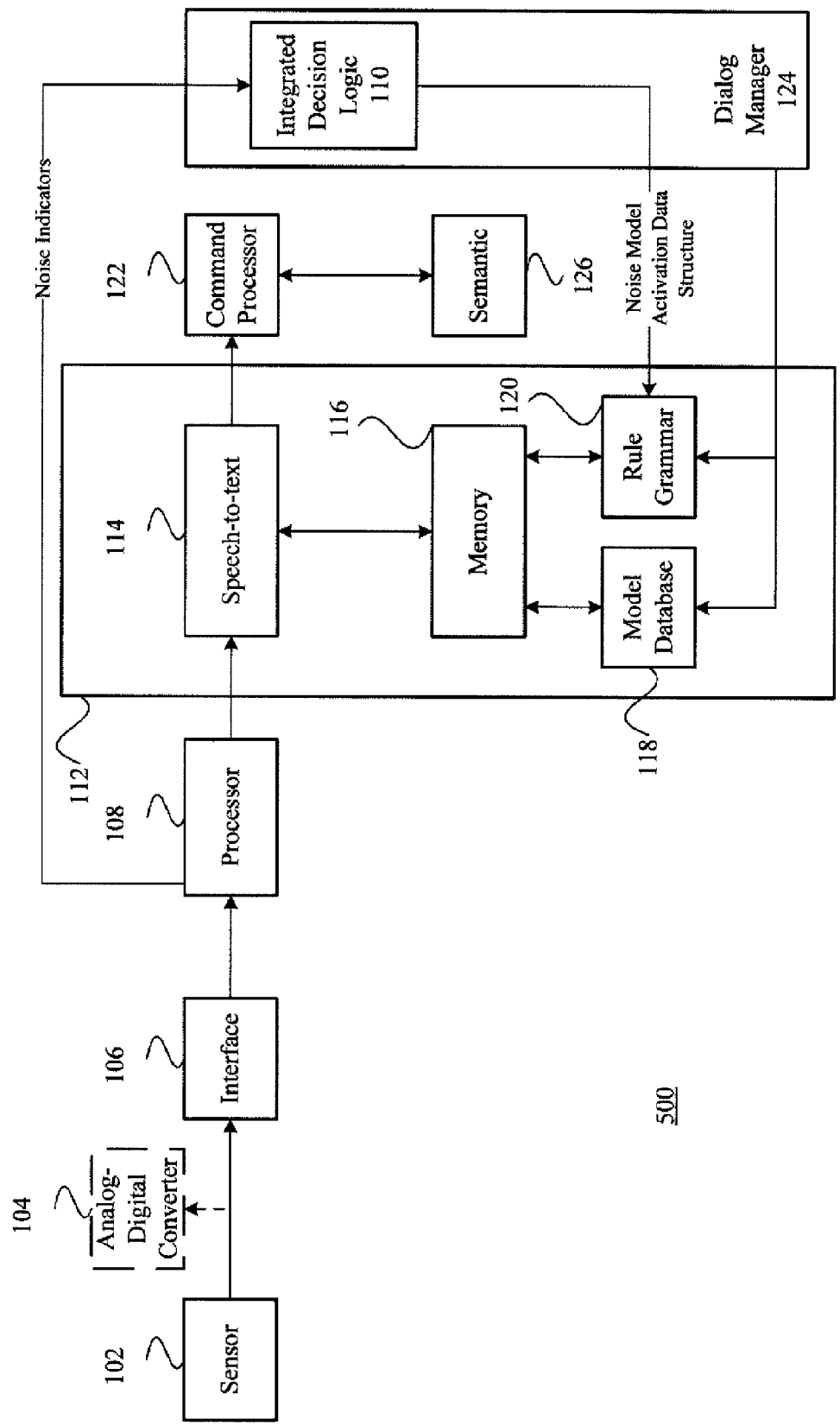
FIG. 5 is a block diagram of an integrating decision unit unitary with a dialog manager.

The integrating decision logic 110 may be integrated with or a unitary part of other portions of an adaptive noise modeling speech recognition system 100. FIG. 2 is block diagram of an alternate adaptive noise modeling speech recognition system 200. In FIG. 2, the integrating decision logic 110 is integrated with or a unitary part of the processor 108. FIG. 3 is a second alternate adaptive noise modeling speech recognition system 300. In FIG. 3, the integrating decision logic 110 is integrated with or a unitary part of the speech recognition engine 112. In other alternate systems, the integrating decision logic 110 may be integrated with or a unitary part of a command processor 122, as in FIG. 4, or a dialog manager 126, as in FIG. 5.

Figure 6:
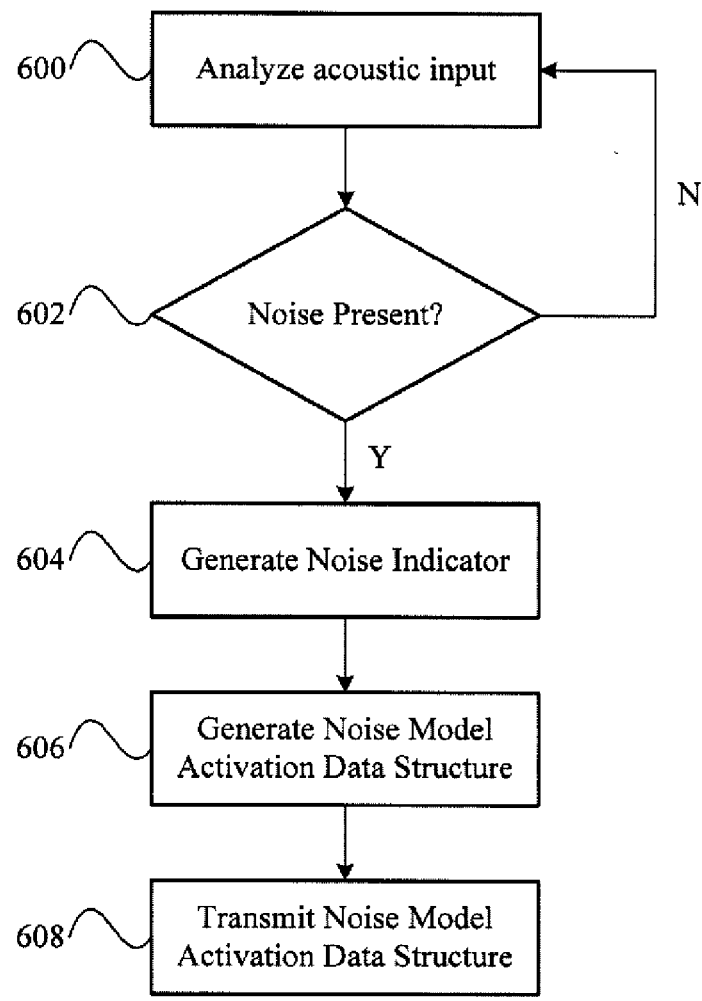
FIG. 6 is a flow diagram of a method that adaptively models speech recognition noise.

FIG. 6 is a flow diagram of a method that adaptively models speech recognition noise. At 600, the system analyzes acoustic inputs and determines if noise is present at act 602. In some systems, the acoustic input may comprise a variable or fixed length acoustic data stream without a conversion into the time domain. Some applications analyze the acoustic data stream by converting it from the time domain to the frequency domain, while other applications process the acoustic data stream in the time domain. The acoustic data stream may be separated into frequency bands and the power level of the frequency bands subjected to a noise estimator to detect the presence of noise. In some systems a power detector may average the power level for each frequency band to determine a background noise level. When the system determines that substantially no noise is present, it may continue to analyze acoustic inputs at act 600. When noise is detected, the system generates noise indicators at act 604.

The noise indicators may be generated by a processor and may include a confidence score, value, or other indicia about the type of detected noise. If the detected noise represented a moderate level of raindrops hitting a vehicle windshield, the noise indicator may be a predetermined value indicating such moderate level of rain. Alternatively, if the detected noise represented a lip smack, the noise indicator may comprise how often in past predetermined amount of time a similar noise was detected. In yet other situations, the noise indicator may be a confidence score representing the likelihood of a particular noise, or may be a value representing the magnitude of the noise. The noise indicators may be generated on an application specific basis and may be configured to provide high level information about the noise, such as whether the system is in a high or low noise area. Alternatively, the noise indictors may provide specific information such as temporal, frequency, and/or other noise specific information.

In some systems, prior to generating the noise indicators, a processor may generate noise data that comprise a subset of data representing the noise. In some systems, this noise data may be a condensed representation of the detected noise. For example, in some systems, the noise data may comprise a noise's loudness or the spectral shape of the noise. Alternatively, the noise data may indicate how changeable a noise is (based on a normalized or unnormailzed scale), or may comprise a pre-stored template, such that when a noise having a particular shape, signal-to-noise ratio, or other indicia is detected the noise data is set to have values of a corresponding pre-stored template. This noise data may be used by a processor to model the detected noise and/or generate the noise indicators.

At act 606, the integrating decision logic processes the noise indicators and generates a noise model activation data structure that comprises data which may be used to control how aggressively one or more of the rules retained in a speech recognition grammar database are applied against acoustic data. In some systems, the noise model activation data structure is generated based on a statistical analysis (e.g., averaging, weighting, scaling, and/or other mathematical evaluations and/or extrapolations) of the noise indicators. In other systems, the noise model activation data structure is generated in response to trained levels stored in an internal or external memory, template pattern matching, and/or other noise modeling data processing techniques. The noise model activation data structure may be a summary and/or integration of the individual noise confidences associated with the generated noise indicator(s). The noise model activation data structure may be derived by linear or nonlinear modeling, where the predictor variables are one or more individual noise levels or confidences. The noise model activation data structure may alternatively be derived from the predictor variables with a neural-network, fuzzy-logic, or other forms of integrating systems.

The noise model activation data structure may be formatted in accordance with an associated speech recognition engine. For example, some speech recognition engines only permit adjusting an aggressiveness of the entire speech recognition engine (e.g., the aggressiveness of all of the grammar rules are set as a group). In these engines, the noise model activation data structure may include data to increase or decrease collectively the aggressiveness of all of the grammar rules, where a grammar rule represents one or more combinations of model-likelihoods, transition probabilities, and other standard implementations of speech-recognition rules. Alternatively, where the speech recognition engine permits the control of individual grammar rules, the noise model activation data structure may comprise a concatenated list or other data structure that allows the aggressiveness of one or more of the grammar rules to be increased and/or decreased.

At act 608, the integrating decision logic transmits the noise model activation data structure to the speech recognition engine. In some systems, the noise model activation data is sent to the speech recognition engine without the speech recognition engine requesting it (e.g., pushed). In other systems, the noise model activation data structure may be transmitted after a predetermined delay. The speech recognition engine may process the received noise model activation data structure and increase and/or decrease the aggressiveness of one or more grammar rules.

Figure 7:
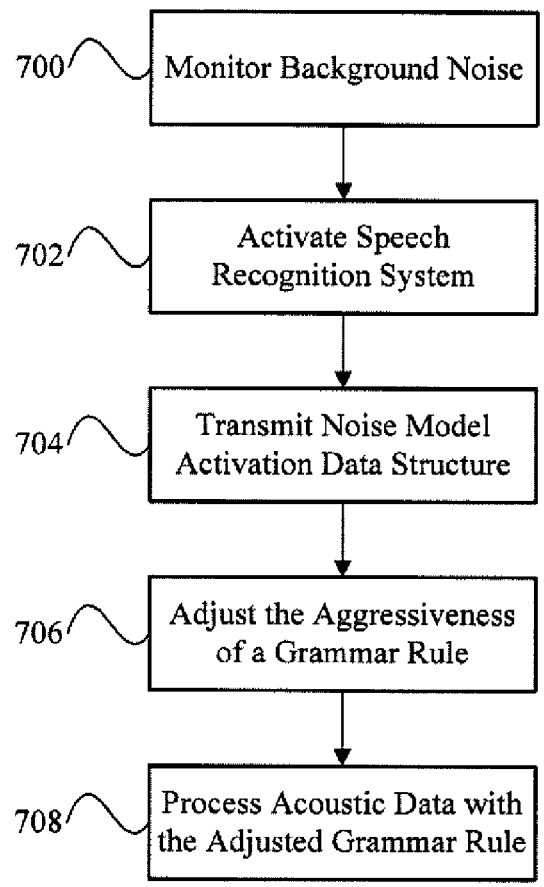
FIG. 7 is a flow diagram of a method that improves speech recognition.

FIG. 7 is a flow diagram of a method that improves speech recognition. At act 700, a sensor, such as a microphone or microphone array, and a processor monitor the background noises of a surrounding environment. This monitoring may occur constantly, or at predefined and/or programmable intervals, to collect data represented the monitored noises. While monitoring the environment, the collected data, or a subset of this data may be transmitted to integrated decision logic which generates a noise model activation data structure as described with reference to FIG. 6.

At act 702 a speech recognition engine that is part of the adaptive noise modeling speech recognition system is activated. Some speech recognition engines are activated by a user actuating a button or a switch. Other speech recognition engines are activated when the processor monitoring the environment, or another processor, detects a voiced acoustic input. Upon activation, the speech recognition engine may set the aggressiveness of the grammar rules to a default configuration. At act 704, the generated noise model activation data structure is transmitted to the speech recognition engine. The speech recognition engine may parse the received noise model activation data structure and identify data relating to one or more grammar rule adjustments. These grammar rule adjustments may be used to increase and/or decrease one or more grammar rules. At act 706, the speech recognition engine adjusts the aggressiveness of the grammar rules according to the data obtained from the noise model activation data structure. In some systems, this new grammar rule setting may be retained as the active configuration until a new configuration is received or until the speech recognition engine or the system is powered down. In other systems, this new grammar rule configuration is retained as the active configuration for a pre-programmed or user programmable time period after which, the grammar rule configuration reverts back to a default setting. At act 708, the received acoustic data is processed using the adjusted grammar rules.

Figure 8:
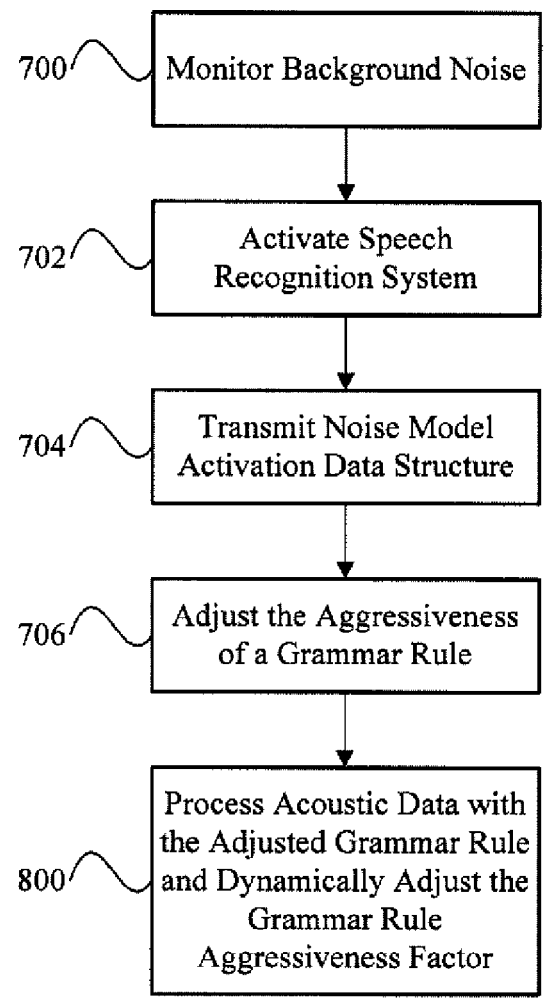
FIG. 8 is a second flow diagram of a method that improves speech recognition.

FIG. 8 is a second flow diagram of a method that improves speech recognition. In FIG. 8, after the aggressiveness of the grammar rules are adjusted at act 706, the speech recognition engine begins to processes received acoustic data at act 800. Additionally, at substantially the same time, the integrated decision logic continues to transmit to the speech recognition engine a noise model activation data structure based on real-time or substantially real-time detected noise data. This noise model activation data structure may contain data that was dynamically updated based on the changing noise conditions in the environment surrounding the adaptive noise modeling speech recognition engine. The speech recognition engine may process this dynamically updated noise model activation data structure in real-time or substantially real-time and dynamically adjust the aggressiveness of the grammar rules.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., trough an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method of adjusting an aggressiveness of a speech recognition engine grammar rule, comprising:
receiving an acoustic signal;
evaluating the acoustic signal with a processor to identify a source of noise in the acoustic signal;
selecting a first noise model to process the acoustic signal, the first noise model selected based on the source of the noise;
generating a noise indicator indicative of a number of prior occurrences of the identified source of noise in the acoustic signal;
processing the noise indicator with a decision logic processor;
generating a noise model activation data structure, at the decision logic processor, based on the noise indicator, the noise model activation data structure comprising data to adjust a setting of a speech recognition rule applied to the first noise model to recognize an utterance in the acoustic signal.

2. The method of claim 1, where the noise model activation data structure further comprises data characterizing a statistical analysis of a plurality of prior noise indicators.

3. The method of claim 1, further comprising using the noise model activation data structure to adjust a speech recognition transition probability setting.

4. The method of claim 3, where the adjustment to the setting of a speech recognition rule applied to the first noise model to recognize an utterance in the acoustic signal and the adjustment to the speech recognition transition probability setting are different.

5. An integrating decision logic that adjusts an activation of a speech recognition grammar rule, comprising:
a processor executing decision logic configured to perform the operations of:
receiving a noise indicator signal associated with a noise component of an input acoustic signal;
extracting characteristics of the noise component from the noise indicator signal; and
generating a noise model activation data structure based on the characteristics which were extracted, the noise model activation data structure containing a grammar rule adjustment indicator that adjusts how a previously configured rule grammar database of a speech recognition engine recognizes utterance subcomponents of the acoustic signal.

6. The integrating decision logic of claim 5, where the grammar rule adjustment indicator comprises an adjustment to a transition probability rule.

7. The integrating decision logic of claim 5, where the grammar rule adjustment indicator comprises an adjustment to a duration probability rule.

8. The integrating decision logic of claim 5, where the grammar rule adjustment indicator comprises an adjustment to an acceptance threshold rule.

9. The integrating decision logic of claim 5, where the grammar rule adjustment indicator is formatted to adjust less than an entirety of grammar rules applied by the speech recognition engine.

10. An adaptive noise modeling speech recognizer, comprising:
a processor executing a noise modeler configured to perform the operations of:
receiving an acoustic signal containing a speech component and a noise component;
identifying a characteristic of the noise component;
generating a noise model activation data structure based on the characteristic of the noise component that was identified, the noise model activation data structure containing a grammar rule adjustment indicator that adjusts a rule of a grammar database included in a speech recognition engine used to recognize an utterance subcomponent of the acoustic signal; and transmitting the received acoustic signal and the noise model activation data structure to the speech recognition engine.

11. The adaptive noise modeling speech recognizer of claim 10, where the characteristic comprises a noise level of the acoustic signal.

12. The adaptive noise modeling speech recognizer of claim 10, where the grammar rule adjustment indicator comprises a magnitude of the noise component.

13. The adaptive noise modeling speech recognizer of claim 10, where the processor is further configured to dynamically update the grammar rule adjustment indicator in real-time.

14. The adaptive noise modeling speech recognizer of claim 10, where characteristic comprises a type of noise.

15. The adaptive noise modeling speech recognizer of claim 14, where the grammar adjustment indicator comprises frequency data representing how often the type of noise is actually identified in the acoustic signal.

16. The adaptive noise modeling speech recognizer of claim 10, where the grammar adjustment indicator comprises a confidence score representing a likelihood of a type of noise.

* * * * *